United States Patent [19]

Dear et al.

[11] Patent Number: 4,479,509
[45] Date of Patent: Oct. 30, 1984

[54] FLUID CONTROL APPARATUS

[75] Inventors: Terrence A. Dear, Elkton, Md.; Allan B. Hughes, Wilmington, Del.

[73] Assignee: E. I. Du Pont de Nemours and Company, Wilmington, Del.

[21] Appl. No.: 369,913

[22] Filed: Apr. 21, 1982

Related U.S. Application Data

[63] Continuation-in-part of Ser. No. 290,082, Aug. 3, 1981, abandoned.

[51] Int. Cl.³ .................... F16K 47/02; F16L 55/02
[52] U.S. Cl. .................................. 137/560; 137/375; 137/625.3; 137/625.37; 181/249; 138/140; 251/122
[58] Field of Search ................. 137/625.4, 625.3, 560, 137/375; 181/249, 250, 255; 418/181; 138/140

[56] References Cited

U.S. PATENT DOCUMENTS

| | | | |
|---|---|---|---|
| 377,963 | 2/1888 | Smith | 137/527.4 |
| 1,811,762 | 6/1931 | Schnell | |
| 2,241,729 | 5/1941 | McCurdy | 181/255 |
| 2,297,046 | 9/1942 | Bourne | 181/18 |
| 2,473,415 | 6/1949 | Doull | 138/140 X |
| 2,583,366 | 1/1952 | Engels | 181/42 |
| 2,918,087 | 12/1959 | Curran | 137/625.3 |
| 3,514,074 | 5/1970 | Self | 251/127 |
| 4,040,440 | 8/1977 | Zaki | 137/375 |
| 4,085,770 | 4/1978 | Woronowicz | 251/315 X |
| 4,122,867 | 10/1978 | Zagotta | 137/625.3 |

FOREIGN PATENT DOCUMENTS 1926526 11/1965 Fed. Rep. of Germany.
26273 9/1962 Japan.

*Primary Examiner*—Arnold Rosenthal

[57] ABSTRACT

A flow control valve installation having blind holes in internal surfaces. The holes are slanted in the downstream direction and tuned to null one or more frequencies in the noise spectrum for the valve by the selection of proper depths for the holes.

14 Claims, 7 Drawing Figures

FLUID CONTROL APPARATUS

CROSS-REFERENCE

This is a continuation-in-part of our application Ser. No. 290,082, filed Aug. 3, 1981, now abandoned.

BACKGROUND

This invention relates generally to the control of a high pressure fluid and, more particularly, to valves used to achieve pressure drops in fluid flow lines.

It is known in the art that objectionable noise is generated along with the desired reduction in pressure as expanding, pressurized fluid flows through the orifice in a control valve and that fluctuations in flow through the orifice have a marked influence on the generation of noise. Attempted solutions have included various devices for subdividing and confining the fluid in its flow through the orifice. These devices, commonly referred to as low noise trim, have not always performed as anticipated and it has, accordingly, been necessary to augment the installations with external retrofits such as insulation, fixed resistance elements, diffusers, silencers and, in some cases, enclosures. When added to the costs of a valve with low noise trim, such retrofits are not feasible from an economic standpoint. Furthermore, available low noise trim is such as to usually require an increase in the size of the valve for a given installation. External retrofits obviously require additional space not contemplated in the design stage.

SUMMARY

The above and other limitations have been alleviated and the level of noise has been reduced appreciably in a valve installation that includes, as elements thereof, structure defining a flow passage, a seat in the passage and a plug movable toward and away from the seat. Such an installation has been modified by provision of tuned, blind holes in surfaces of one or more of the above elements. The holes face downstream in that they are disposed angularly in the intended direction of flow through the passage and inclined with respect to a surface.

DRAWINGS

Other objectives and advantages of the present invention will be apparent from the following description wherein reference is made to the accompanying drawings in which FIG. 1 is a cross section of one embodiment of the control valve;

DESCRIPTION

Figure 1:
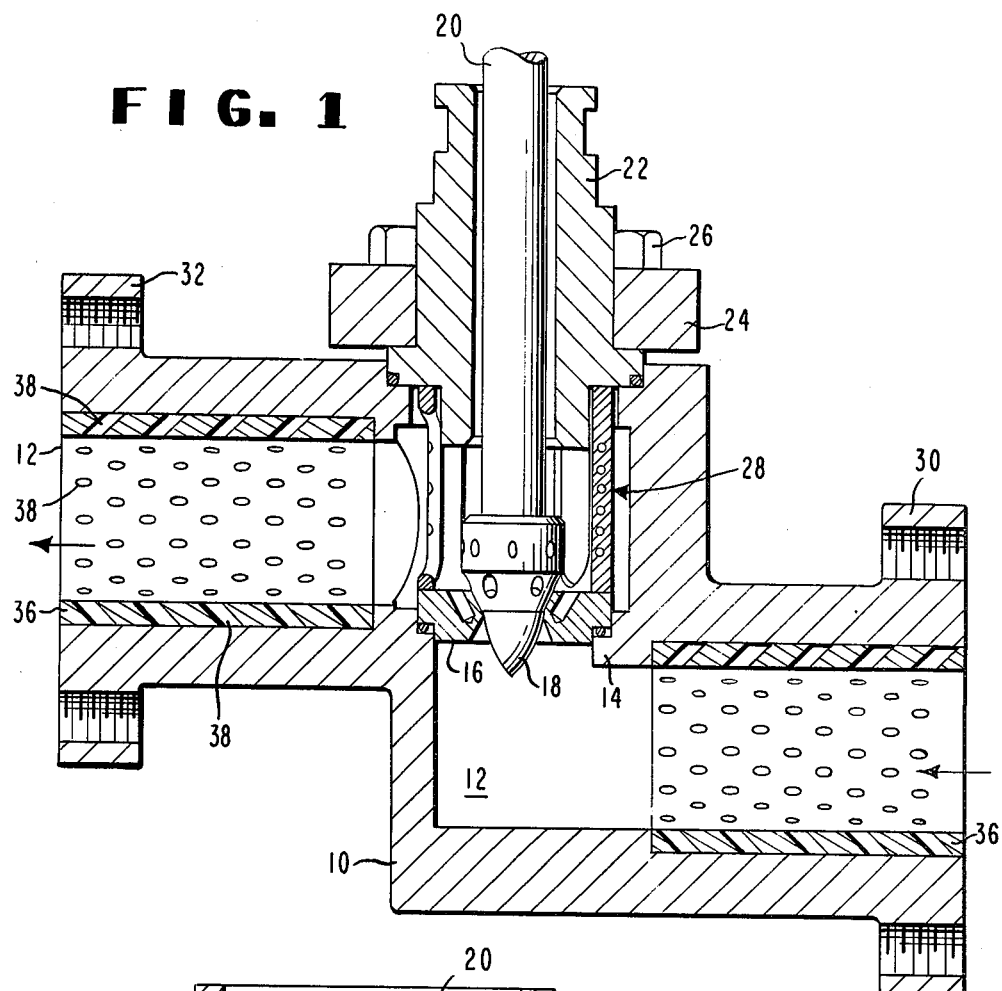

In FIG. 1, the improvements of the present invention have been shown in a test valve having a body 10 provided with a through passage 12. In body 10, where passage 12 changes direction, there is a bridge 14 that receives a seat ring 16. Seat 16 is shaped to receive the tapered end of a plug 18 when the flow through passage 12 is to be interrupted. Plug 18 is on the end of a stem 20 and the stem projects from body 10 through a bonnet 22. Bonnet 22 is held in place by a bonnet flange 24 and cap screws 26. A seat-retaining cage 28 is fitted between bonnet 22 and seat ring 16. At the inlet and outlet of passage 12, body 10 has inlet and outlet flanges 30, 32 adapted for attachment to other flanges or elements in a fluid flow line.

Adjacent flanges 30, 32, passage 12 has straight lengths fitted with inner sleeves 36. Each sleeve 36 has a plurality of angularly disposed, round holes 38 that present elliptical apertures in its inner surface. As illustrated, holes 38 face downstream, i.e., are disposed angularly in the intended direction of flow through passage 12. The manner in which each hole is sized or "tuned" to null sound waves over a narrow band of frequencies is described below.

Figure 2:
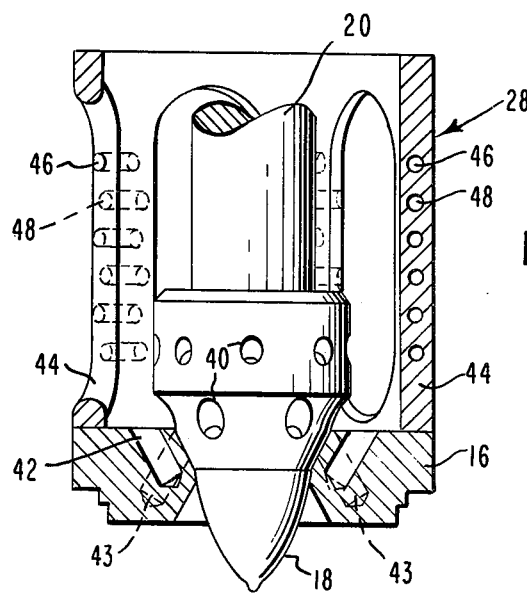
FIG. 2 is an enlargement of the cage and plug shown in FIG. 1.

Similarly disposed, tuned, blind holes in the seat, plug and cage are shown best in FIG. 2. Plug 18 has holes 40 drilled inwardly and downwardly toward its axis. Seat 16 has holes 42 drilled inwardly and downwardly toward its center alternating with holes 43 drilled downwardly and outwardly from the bevelled seat. Cage 28 has spaced, circumferentially disposed webs 44 and each web has staggered rows of holes 46, 48 drilled into its opposed, rounded edges.

As indicated by arrows (FIG. 1), pressurized fluid flows into valve 10 at flange 30 and through the orifice in ring 16 to flange 32. In doing so, the fluid passes over the apertured surfaces of the sleeves 36, ring 16, plug 18 and cage 28.

Figure 3:
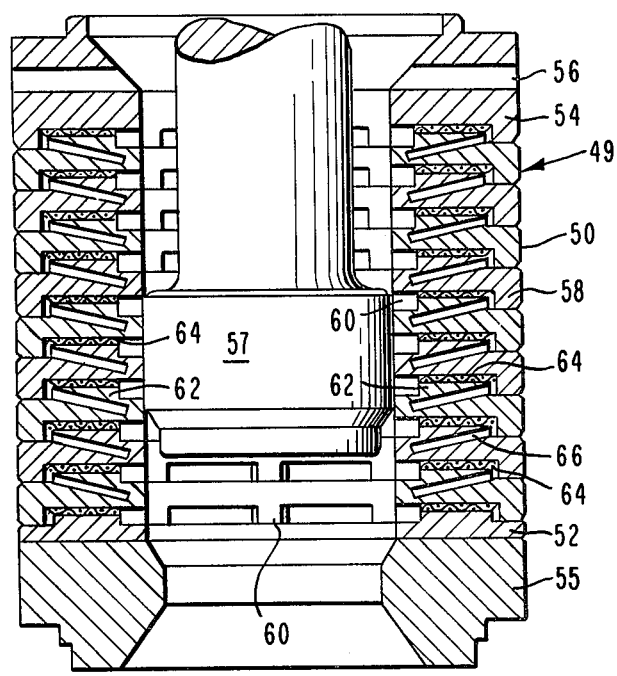
FIG. 3 is a similar view of a modified cage and plug.

The modified cage shown at 49 in FIG. 3 includes a plurality of identical discs 50 stacked between a lower, end plate 53 and an upper, end plate 54. Plate 52 engages seat ring 55 and the upper side of plate 54 has an annular lip that fits in a seat on the bonnet. Plate 54 has vent ports 56 for balancing the forces on plug 57 when it is in an open position. Each disc 50 has dependent outer and inner legs 58, 60 and an annular ledge 62 on its upper side. The heights of legs 58, 60 and ledges 62 are such as to define an annular duct between adjacent discs and an annular screen 64 is located in each duct. In addition, a plurality of radially disposed, inwardly and downwardly sloped, tuned holes 66 are drilled into the outer edge of each ledge 62.

The blind holes are tuned according to the wavelength of the predominant tone in the spectrum of noise generated in an unmodified valve. Such a valve can be installed in an air test line, with a microphone nearby, and placed in operation at various flow rates while the generated noise is charted. After noting the frequency of the predominant tone, using a frequency spectral analyzer (Nicolet 446A FFT) and a digital plotter, blind holes are provided in the surfaces of one or more of the elements in the valve. The length of the holes is a fourth of the wavelength ($\lambda/4$) of the predominant tone. Once noted for several sizes of valves and under different test conditions of pressure and flow (Cv), the frequency of the predominant tone can be predicted for future installations. For a two-inch valve, the predominant tone has a frequency of 8250 hertz (Hz). To null noise at that frequency, the blind holes have a depth of 0.410 inch. Adjacent holes should have their edges spaced at 1.5–1.75 times the hole diameter and the diameter should not exceed a half of the depth. To achieve the maximum effect, the holes are as large and spaced as frequently as is practicable. In the latter respect, if the holes are too small, cross modes are produced and, if too large, sound waves are reflected at angles greater than desired.

Comparative tests of valves of the type shown in FIGS. 1–3, with tuned holes in one or more surfaces, show that progressively lower, A-weighted noise levels (dBA) are achieved as the number and locations of holes are increased, i.e., holes can be provided in one or more elements, with the best results obtained as the number of holes is increased. The lowest noise levels were obtained when the cage 49 (FIG. 3) was substituted for the cage 28 (FIGS. 1 and 2).

Sleeves 36 with holes 38 disposed at different angles have also been tested in valves of the type shown in FIG. 1. Neither the cage, seat nor the plug was provided with holes. Best results were obtained with the holes disposed at an inclination of 60°. At a high flow rate, the noise level was reduced by 8 dBA from the noise level obtained with imperforate sleeves. With the holes disposed at angles of 30° and 45°, the noise level was reduced by more than 7 dBA. With the holes disposed at 90°, the noise level was reduced by about 6 dBA but only at the expense of turbulence and a reduction in flow rate. In these respects, it should be noted that each reduction of 3 dBA represents a 50% reduction in acoustic energy.

In addition to a predominant tone, the spectrum of noise generated by a valve has several peak frequencies. It will occur to those skilled in the art that further reductions in noise could be achieved by tuning some of the holes to one or more of those frequencies and the rest to the predominant tone. Such a modification has been shown in FIG. 4 where the tuned holes 38a, 38b, 38c have different depths. Those skilled in the art will recognize that sectional sleeves 36 could be provided with holes of different depths in different sections.

Figures 4, 5:
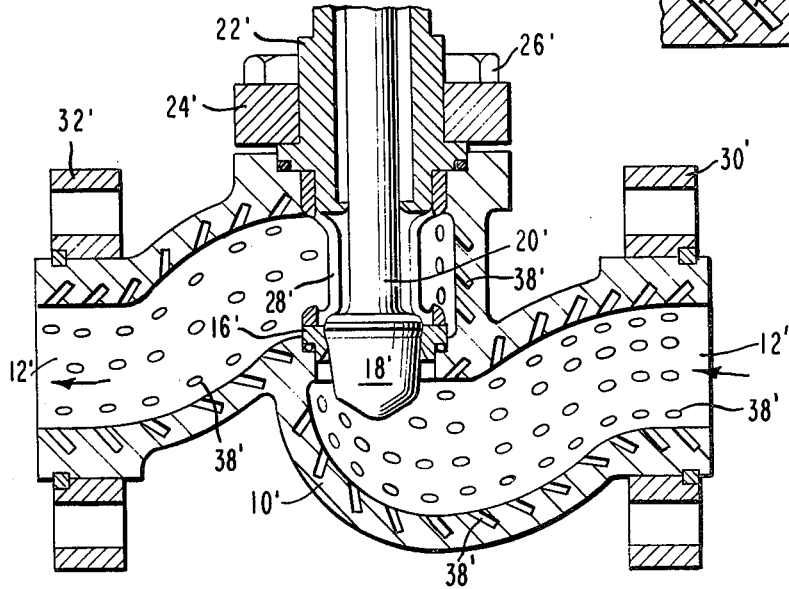
FIG. 4 is a cross section of a modification of the sleeves shown in FIG. 1.
FIG. 5 is a cross section of a globe valve modified in accordance with the teachings of the present invention.

In the globe valve shown in FIG. 5, the same numerals with primes designate parts and features corresponding to parts and features of the test valve shown in FIG. 1. Tuned holes 38' would be cast in body 10', using a sand core with projecting spikes, and could, of course, vary in depth as shown in FIG. 4.

Figure 6:
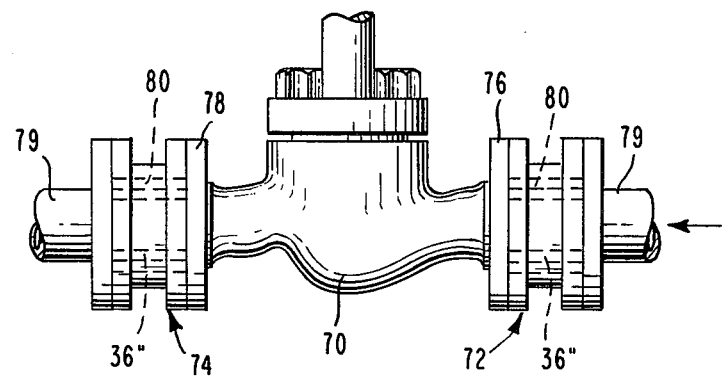
FIG. 6 is an elevational view of an unmodified globe valve with short extensions attached to the inlet and outlet flanges.
Figure 7:
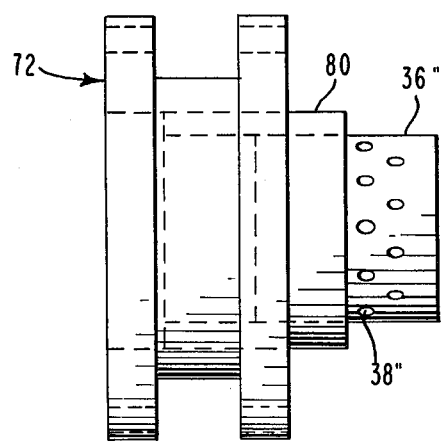
FIG. 7 is an enlarged view of one of the extensions shown in FIG. 6 with a liner and sleeve partially removed from their normal positions.

In the installation shown in FIG. 6, an unmodified globe valve 70 has extensions 72, 74 attached to inlet and outlet flanges 76, 78. Each extension includes a short length of pipe between a pair of flanges with which it is attached to valve 70 and a similar flange in a fluid flow line 79. In this installation, the flow passage is defined not only by the structure of valve 70 but also by extensions 72, 74 and adjacent lengths of flow line 79. Referring to FIG. 7, each extension contains an imperforate liner 80 and a sleeve 36" provided with holes 38" disposed angularly in the direction of flow through the valve installation. In use, liners 80 and sleeves 36" are within extensions 72, 74, as shown by broken lines in FIG. 6. It will be apparent on inspection that liners 80 could be eliminated in favor of a tight fit between sleeves 36" and the bores of the extensions.

In comparative tests of installations of the type shown in FIGS. 6 and 7, at various flow rates, best results were obtained with the blind holes inclined at an angle of 60°. At high flow rates, the noise level was reduced by more than 9 dBA from the level obtained with imperforate sleeves. With the holes disposed at an angle of 45°, a reduction of about 8.5 dBA was achieved. At an angle of 30°, a reduction of about 7.5 dBA was obtained. With the holes disposed at 90°, a reduction of about 6.5 dBA was obtained but, here again, there was turbulence and a consequent reduction in flow rate. At lesser flow rates in the normal operating range for the valve, levels approaching and even below the current goal of 85 dBA have been achieved.

In summary, the data show that the best results have been obtained, in all of the tests, with blind holes inclined at an angle of about 60°. Worthwhile reductions in noise levels have been achieved with the blind holes inclined at angles between about 30° and approaching 90°.

The installations shown in FIGS. 1, 5 and 6 all have tuned, blind holes at locations upstream and downstream of the trim and this is as it should be when the flow through the passage is subsonic. Where there is a fully developed, choked flow, the larger proportion of the noise generated at the trim is propagated in the direction of flow. Thus, for some installations, it will be sufficient to provide tuned holes only at locations downstream of the trim.

What is claimed as new and desired to be secured by Letters Patent is:

1. In a valve including, as elements thereof, a body with a passage therethrough, a seat in the passage, a solid plug movable toward and away from the seat, and a seat-retaining cage surrounding the plug, all of said elements having exposed surfaces in said passage, the improvement comprising provision of tuned, blind holes in the surface of said cage, said holes being disposed angularly in the intended direction of flow through said passage and inclined with respect to said surface of the cage.

2. The valve of claim 1 wherein said cage comprises a plurality of stacked discs, each having an annular ledge on one side thereof and wherein is provided an annular screen between each ledge and the adjacent disc, the blind holes in said cage being radially disposed beneath the ledges.

3. In a valve including, as elements thereof, a body with a passage therethrough, a seat in the passage and a plug movable toward and away from the seat, all of said elements having exposed surfaces in said passage, the improvement comprising provision of frequent, tuned blind holes in the surface of said body downstream of the seat, said holes being disposed angularly in the downstream direction and inclined with respect to said surface.

4. The valve of claim 3 wherein the depths of the holes are related to one or more frequencies in the noise spectrum for the valve.

5. The valve of claim 3 wherein the holes are tuned to one or more frequencies in the noise spectrum for the valve in that the depths of the holes are a quarter of the wavelength of said frequency or frequencies.

6. In a valve installation including structure defining a flow passage, a seat in the passage and a plug movable toward and away from the seat, said structure, seat and plug presenting exposed surfaces, in said passage, the improvement comprising provision of frequent, tuned, round, blind holes in the surface of said structure, downstream from said plug, said holes being disposed angularly in the intended direction of flow through the installation, said holes being inclined with respect to and presenting elliptical apertures in said surface.

7. The valve installation of claim 6 wherein said structure comprises a flow line including a valve body and a short length of pipe downstream from the valve body, said blind holes being located in said length of pipe.

8. The valve installation of claim 7 wherein said blind holes are also provided in the surfaces of said seat and/or said plug.

9. The valve installation of claim 7 wherein said valve body has an inlet and an outlet and said length of pipe is attached to the outlet.

10. The valve installation of claim 9 wherein another length of pipe provided with said blind holes is attached to said inlet.

11. The valve installation of claim 7 wherein is provided a sleeve in said length of pipe and said blind holes are through holes in said sleeve.

12. The valve installation of claim 11 wherein said holes are inclined at an angle of from about 30° to an angle approaching 90°.

13. The valve installation of claim 11 wherein said holes are inclined at an angle of about 60°.

14. A valve installation comprising structure defining a flow passage, a seat in the passage, a plug movable toward and away from the seat and a seat-retaining cage surrounding the plug, said cage including a plurality of stacked discs with annular screens therebetween, said structure having a downstream surface provided with frequent, tuned, blind holes inclined with respect to said surface and in the downstream direction.

* * * * *